G. W. Keller.
Fire Escape.
No. 10,807.    Patented Apr. 18, 1854.
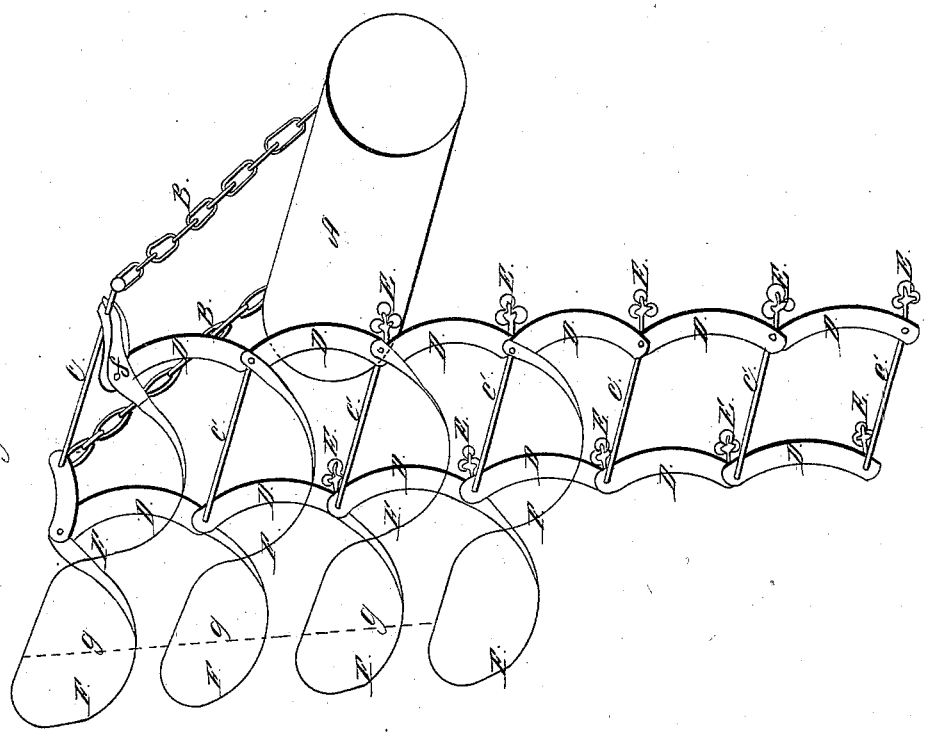
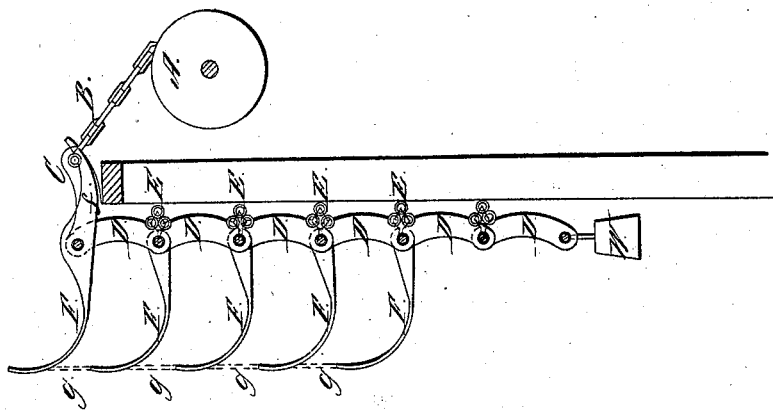
Witnesses:
Edward A. Page
Henry Bacmeister
Inventor:
Geo. Wm. Keller

UNITED STATES PATENT OFFICE.

GEO. W. KELLER, OF PHILADELPHIA, PENNSYLVANIA.

FIRE-ESCAPE.

Specification of Letters Patent No. 10,807, dated April 18, 1854.

*To all whom it may concern:*

Be it known that I, GEORGE W. KELLER, of Philadelphia, in the county of Philadelphia and State of Pennsylvania, have invented a new and useful Safety-Chain for the Protection of Life in Case of Fire; and I do hereby declare that the following is a full, clear, and exact description of the construction and operation of the same, reference being had to the annexed drawings, making a part of this specification, in which—

Figure 1 is a perspective view and Fig. 2, a longitudinal elevation.

A is a cylinder made of wood or other suitable material, which can be made to revolve on bearings attached to the inside of a building, opposite a window. The bearings of the roller A are either fastened to the floor or inclosed in a chest which at the same time may serve the purpose of a seat or other piece of furniture. Two chains B are firmly attached to the circumference of the cylinder A and have their other extremities secured to a round bar C, which bar forms a joint for the first link D of a double chain composed of a number of curved links D, D made of sheet iron or other suitable material. The joints of the double chain are united by bars C' C' gradually decreasing in length from top to bottom and thus forming a number of steps similar to the rounds of a ladder, by which a person is enabled to descend from the window to the ground.

To facilitate the operation of throwing the chains over the window sill, I apply friction rollers E connected with the joints of the links D in manner shown in the drawing. By means of the rollers E the chain will slide over the window sill with ease and the rollers E will also serve to keep the links D and their connecting bars C at a suitable distance from the wall. For additional safety I attach to each connecting bar C a curved guard F made of metal and turning freely round the joints of the chain. The uppermost of the guards F is furnished with a projecting piece or lever *f* which is held down to its proper position by the bar C. The other guards F are connected with the first one by the chains G, G.

By the combination of the chains and guards, as described in the above, I form an inclosed passage, through which a person may descend with safety thereby avoiding the possibility of a fall backward from fright, faintness or any other cause. Both the links of the chain and the guards are curved in such a manner as to fit the circumference of the cylinder A.

When the apparatus is not in use, the chains and guards are wound upon the roller A, and to make it ready for use it is only necessary to unroll a few links and throw them over the window sill, when by its own weight aided by the counterweight W attached to the end, the rest of the chain will descend.

I claim—

The double chain in combination with the friction rollers E and guards F substantially as herein set forth.

GEO. WM. KELLER.

Witnesses:
HENRY BACMEISTER,
EDWARD A. PAGE.